United States Patent
Mizukami et al.

(10) Patent No.: US 6,686,034 B1
(45) Date of Patent: Feb. 3, 2004

(54) PROCESS FOR PRODUCING A FIBER-REINFORCED THERMOPLASTIC RESIN MOLDED PRODUCT AND PRODUCT THEREBY PRODUCED

(75) Inventors: Toru Mizukami, Tokyo (JP); Kengo Ozaki, Tokyo (JP); Masahiko Tominaga, Tokyo (JP); Yuji Yokoo, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 215 days.

(21) Appl. No.: 09/763,865

(22) PCT Filed: Jun. 28, 2000

(86) PCT No.: PCT/JP00/04251
§ 371 (c)(1),
(2), (4) Date: Feb. 28, 2001

(87) PCT Pub. No.: WO01/00392
PCT Pub. Date: Jan. 4, 2001

(30) Foreign Application Priority Data

Jun. 28, 1999 (JP) .......................................... 11-182341
Jul. 14, 1999 (JP) .......................................... 11-200384
Sep. 6, 1999 (JP) .......................................... 11-251970

(51) Int. Cl.$^7$ ............................................... B32B 27/12

(52) U.S. Cl. ..................... 428/297.4; 428/213; 428/220; 428/542.6; 428/298.1; 428/300.7; 264/102; 264/345; 264/304.6; 264/306.3; 264/454; 264/503

(58) Field of Search ............................. 428/306.6, 213, 428/215, 220, 542.6, 297.4, 298.1, 300.7; 264/511, 102, 258, 257, 348, 345, 347, 349, 304.6, 306.3, 250, 454, 503, 572

(56) References Cited

U.S. PATENT DOCUMENTS

| | | | | |
|---|---|---|---|---|
| 4,735,003 A | | 4/1988 | Dykeman | |
| 4,915,896 A | * | 4/1990 | Rachal et al. | 264/511 |
| 4,948,661 A | * | 8/1990 | Smith et al. | 428/286 |
| 5,350,556 A | * | 9/1994 | Abe et al. | 264/248 |
| 5,560,985 A | * | 10/1996 | Watanabe et al. | 428/251 |
| 5,725,940 A | * | 3/1998 | Sakai et al. | 428/318.6 |
| 5,773,042 A | * | 6/1998 | Amano et al. | 425/207 |
| 6,455,143 B1 | * | 9/2002 | Ishibashi et al. | 428/294.1 |

FOREIGN PATENT DOCUMENTS

| | | |
|---|---|---|
| EP | 0 376 472 | 7/1990 |
| EP | 0 916 477 | 5/1999 |
| JP | 7-164439 | 6/1995 |
| JP | 7-184704 | 7/1995 |
| JP | 11-56410 | 3/1999 |

* cited by examiner

Primary Examiner—Merrick Dixon
(74) Attorney, Agent, or Firm—Oblon, Spivak, McClelland, Maier & Neustadt, P.C.

(57) ABSTRACT

A new process for producing a fiber-reinforced thermoplastic resin molded product with a high mechanical strength and no heat substantial deterioration of the resin, by an efficient heating without applying shear stress to the fiber-reinforced thermoplastic resin base material and a molded product, for example, a tiptoe core for a safety shoe produced by said process are provided.

The fiber-reinforced thermoplastic resin base material P1 in a string form or a tape form is scattered and accumulated in a vessel such as tube 11, and a heating gas passed to the accumulated base material to melt heat, and preferably press by a plunger 15, the base material P1, whereby a molten mass P2 is formed, and then the molten mass P2 is dislocated to a mold to be press-mold. Said base material preferably satisfies the following formula: $1/100 \leq \rho_1/\rho_0 \leq 1/2$, wherein $\rho_0$ means a density where said base material is scattered and accumulated and $\rho_0$ means a true density of said base material.

18 Claims, 5 Drawing Sheets (e)

(f)

F I G. 3
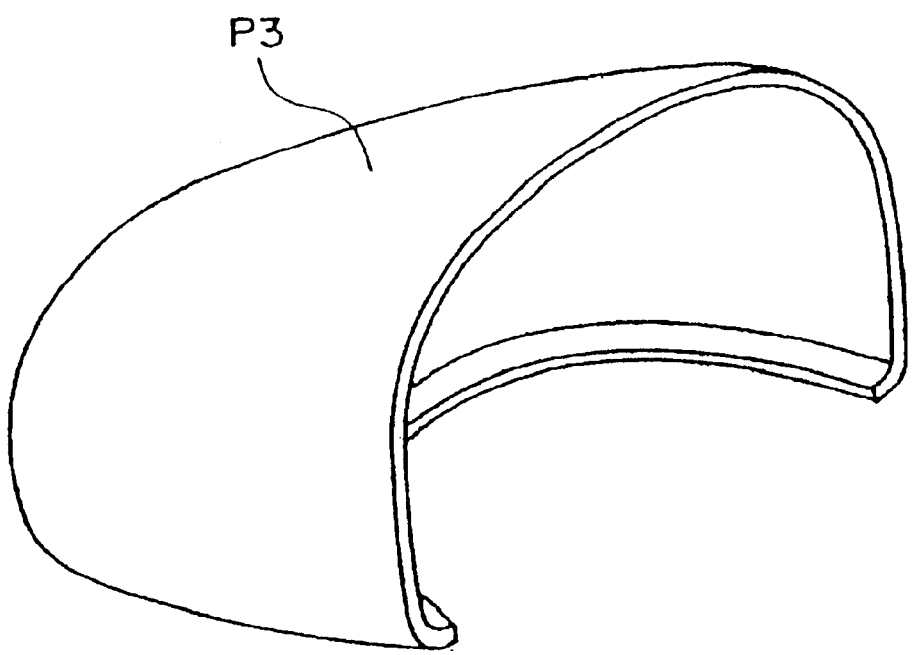

PROCESS FOR PRODUCING A FIBER-REINFORCED THERMOPLASTIC RESIN MOLDED PRODUCT AND PRODUCT THEREBY PRODUCED

TECHNICAL FIELD

The present invention relates to a new process for producing a fiber-reinforced thermoplastic resin molded product, which is suitable for producing automobile parts, electrical appliances, industrial materials, civil engineering materials, commodity products, etc. These products are required to have good outer appearance as well as high mechanical strength and high rigidity.

The present invention also relates to a product such as a tiptoe core for a safety shoe, manufactured by said new process.

BACKGROUND ART

As a process for manufacturing a thermoplastic resin molded product reinforced with fibers, it is known that a sheet of continuous fibers or a chopped glass fiber mat impregnated with a molten thermoplastic resin (hereafter referred to as GMT), is used. GMT is reheat-melted and press-molded after having been cut out in order to adapt it to the shape of an objective product.

However, when GMT is molded, the resulting molded product has deficiency in mechanical strength and outer appearance, due to insufficient impregnation of a thermoplastic resin to glass fibers. Further, when GMT is heat-melted, a phenomenon tends to occur that it expands in a direction of the thickness, which will lower a heat conduction to the inside of the GMT to result in low heat efficiency In order to solve the problems caused by the insufficient impregnation with the resin, JP-A-7-164439 discloses a molded sheet as a material for a hot stamping molding and a high speed press-molding. Such a molded sheet is prepared by scattering and accumulating fiber-reinforced thermoplastic resin base material, followed by molding it under heat and pressure.

Moreover, JP-A-7-184704 and JP-A-7-11-56410 disclose a tiptoe core for a safety shoe molded by using such a molded sheet mentioned above.

However, the manufacturing process of a molded product disclosed in JP-A-7-164439 requires three heating steps i.e. a step of preparing the fiber-reinforced thermoplastic resin base material, a step of preparing a sheet and a step of re-heating the sheet for press-molding. This process is not preferred from a view point of the energy consumption and causes the heat deterioration of the thermoplastic resin used.

Further, the step of preparing a sheet leads usually to a trim-loss which will lower the yield of the material obtained. Moreover, in the press-molding, a cutting out (a blanking) of the sheet is required in order to adapt the size of the sheet to a mould, wherein a blanking-loss occurs. Such will further lower the work efficiency as well as the production efficiency.

As a result, a tiptoe core for a safety shoe disclosed in JP-A-7-184704 and JP-A-7-11-56410 can manage to satisfy a mechanical strength for L kind and S kind stipulated in Japanese Industrial Standard (JIS) T 8101 (a safety shoes made of leather). However, the molding by using the above mentioned sheet tends to result in the poor productivity and economy.

Under these circumstances, it is an object of the present invention to provide a new process for producing a fiber-reinforced thermoplastic resin molded product with high mechanical strength and no substantial heat deterioration of the resin used, which is attained by an efficient heating without applying shear stress to the fiber-reinforced thermoplastic resin base material.

It is another object of the present invention to provide a fiber-reinforced thermoplastic resin molded product such as a tiptoe core for a safety shoe, produced by said new process.

DISCLOSURE OF THE INVENTION

A process for producing a fiber-reinforced thermoplastic resin molded product of the present invention to accomplish the above objects comprises a step of supplying a base material wherein a fiber-reinforced thermoplastic resin base material in a string form or in a tape form is scattered and accumulated, a step of forming a molten mass wherein a heating gas is passed to said base material accumulated to heat-melt it thereby to form a molten mass, and a molding step of wherein said molten mass is supplied to a mold and then is press-molded to form a molded product.

According to the present invention, the fiber-reinforced thermoplastic resin base material in a string form or in a tape form is scattered and accumulated and a heating gas is passed to openings or gaps among said bulkily accumulated base materials, whereby said base material can be quickly and uniformly heat-melted to form a molten mass. Thus resulting molten mass can be press-molded to produce a molded product with superior mechanical strength attributed to the long residue fibers contained and good outer appearance. Further, in the present invention, after said base material having been produced, the heat-melting of the resin can be one time, whereby the cost of energy consumption will be reduced and the work efficiency will be improved as well as the heat deterioration of the resin will be lowered.

In the present invention, when a bulk density of the fiber-reinforced thermoplastic resin base material in the accumulated state is defined as $\rho_3$, and a true density of the base material is defined as $\rho_0$, it is preferred to satisfy the following formula.

$$\tfrac{1}{100} \leq \rho_1/\rho_0 \leq \tfrac{1}{2}$$

When the base material satisfies the above formula, the accumulation of said base material can become properly bulky, whereby heating gas can efficiently pass through the base material and thus the heating can carried out in a short period of time. The above bulk density $\rho_1$ is the density of the base material which is scattered and accumulated randomly as much as possible in a vessel having a inner diameter bigger than the length of the base material. The above true density $\rho_0$ the density (a theoretical density) is the density of the base material itself.

Further, the fiber-reinforced thermoplastic resin base material used in the present invention has preferably the following characteristics of from a) to d).

a) a string form with an average diameter of from 0.1 to 1.5 mm, b) a reinforcing fiber content of from 15 to 80 vol %, c) a average length L of from 10 to 50 mm, d) L/D of from 15 to 100, where D is an average diameter.

When the fiber-reinforced thermoplastic resin base material has the above characteristics, the base material become a fine and a needle-like shape to make the resulting accumulated base material easily voluminous, whereby the heating gas can be smoothly passed through the base material to result in a uniform and rapid heating of the base material.

Further, after passing the heating gas to the accumulated fiber-reinforced thermoplastic resin base material to melt it, it is preferred to press the resulting molten base material to form a molten mass, whereby a time required for the cooling of the molten mass to the solid can be delayed since the surface area of the molten mass can become small.

It is also preferred to prepare the molten mass in such a manner that the average fiber length in the molten mass can retain at least 95% of its original length in the base material, whereby the mechanical strength of the fiber-reinforced thermoplastic resin molded product such as a tiptoe core for a safety shoe can be improved.

It is also preferred to carry out the step of forming the molten mass and the step of forming the molded product in such a manner that the average fiber length in the molded product can retain at least 90% of the original length in the base material, whereby the mechanical strength of the fiber-reinforced thermoplastic resin molded product such as a tiptoe core for a safety shoe can be improved.

It is also preferred to use air and/or inactive gas as the heating gas which is passed through the accumulated fiber-reinforced thermoplastic resin base material. Air is preferably used from the cost saving, and inactive gas such as $N_2$, Ar, $CO_2$, etc. can reduce the deterioration caused by the oxidation of the thermoplastic resin.

It is also preferred to control the temperature T of the heating gas to pass through the accumulated fiber-reinforced thermoplastic resin base material within the following formula: $T_1 \leq T \leq T_1 + 100°$ C., wherein $T_1$ is a melting point of the thermoplastic resin. As a result, the thermoplastic resin can be efficiently melted while the deterioration of the thermoplastic resin is reduced.

Further, a process for producing the fiber-reinforced thermoplastic resin molded product of the present invention can be carried out by using a package containing a fiber-reinforced thermoplastic resin base material, wherein the heating gas is applied to the package to melt it thereby to make an opening or a hole in the package and through the opening the heating gas can be passed to the base material. As a result, it can be carried out to prepare the molten mass by heat-melting the base material and supplying the resulting molten mass to a mold to press-mold it.

According to the present invention using the package, a predetermined amount of the fiber-reinforced thermoplastic resin base material is packed with a thermoplastic resin film, whereby good handling and transportation of said base material can be attained. It is possible to produce a molded product efficiently since a blanking step and a measuring step on site are omitted. Accordingly, on the site where a molding is carried out, it is only required to arrange the package containing a fiber-reinforced thermoplastic resin in a string form or in a tape form into a vessel and the like through which a heating gas is passed. Thus, the fiber-reinforced thermoplastic resin base material packed in the package is kept in its bulkily accumulated state, whereby a step s of scattering and accumulating said base material is not needed on site.

Further, in the present invention, it is possible for a heating gas to pass easily through the gaps in the fiber-reinforced thermoplastic resin base material in its bulkily accumulated state by applying a heating gas to the package to make a hole in the thermoplastic resin film of the package. Thus, said base material can be rapidly and uniformly heat-melted to prepare a molten mass. The resulting molten mass is subsequently press-molded to form a molded product with the high mechanical strength due to long fibers contained, and good outer appearance. Moreover, after said base material having been produced, the heat-melting of the resin can be one time, whereby the cost of energy consumption will be reduced and the work efficiency is improved as well as the heat deterioration of the resin will be lowered.

Moreover, when the bulkily accumulated fiber-reinforced thermoplastic resin base materials are heat-melted to prepare the molten mass, the ends of the molten mass is likely to be over cooled. In the present invention, the ends of the molten mass can be covered with the molten thermoplastic resin film of the package during the heating step, and thus the cooling of the molten mass can be avoided.

As an example of a molded product produced by any one of the processes of the present invention, it is possible to manufacture a tiptoe core for a safety shoe which satisfies the performance of S kind standard as safety shoes stipulated in JIS T 8101. The tiptoe core for a safety shoe, produced by heat-melting the fiber-reinforced thermoplastic resin base material to prepare a molten mass and then to press-mold the resulting mass as mentioned before, has the good outer appearance and the light weight as well as the mechanical strength satisfying the performance of S kind standard as safety shoes stipulated in JIS T 8101 due to the long fibers contained and the small heat deterioration of the resin.

The tiptoe core for a safety shoe of the present invention has preferably at most 35 g as the weight of one piece and at most 4 mm as the thickness of its maximum part. Accordingly, said tiptoe core for a safety shoe is excellent in the weight, the compactness and the mechanical strength.

BRIEF DESCRIPTION OF DRAWINGS

FIG. 3 is a perspective view showing a example of the product obtained by the process of the present invention.

DETAILED DESCRIPTION OF THE INVENTION

Figure 1:
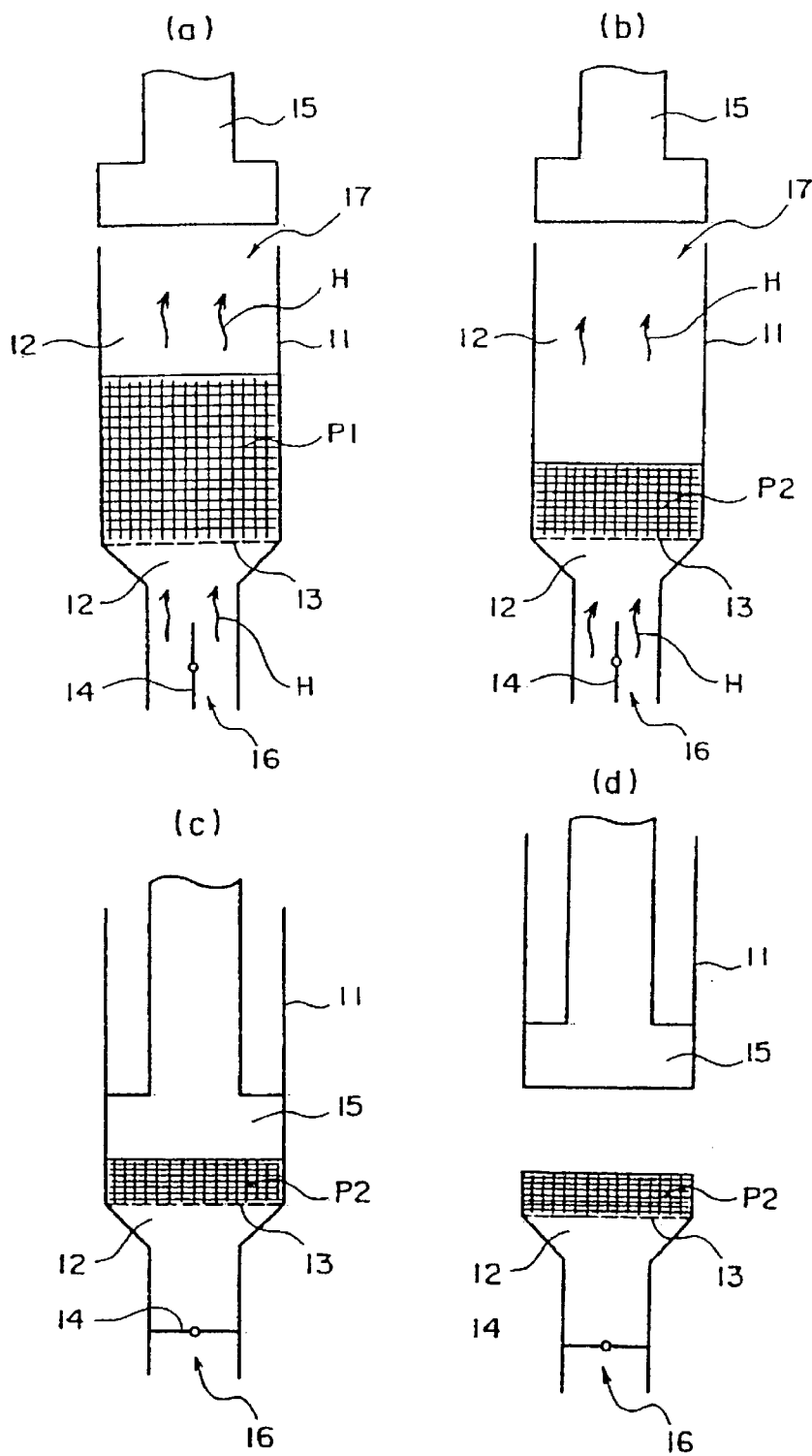
FIG. 1 is a view illustrating a step of supplying the base material and a step of preparing the molten mass showing an example of a process for producing a fiber-reinforced thermoplastic resin molded product of the present invention.

Now, the present invention will be described in further detail with reference to the preferred embodiments.

The thermoplastic resin to be used in the present invention is not particularly limited, and various resins which are commonly available in the market, can be used. For example, a polyolefin resin, a polyamide resin, a polyester resin, polycarbonate resin, a polyphenylene sulfide resin or a polystyrene may, be employed. Among them, a polyolefin resin, a polyamide resin or a polyester resin is preferably used particularly from the view pint of the impregnation property to the fibers, the cost and the physical property. Specifically, the polyolefin may, for example, be polypropylene or polyethylene. The polyamide resin may, for example, be nylon 6-6, nylon 6, nylon 12 or MXD nylon. Further, the polyester resin may, for example, be polyethylene terephthalate or poly butylene terephthalate. These resins are particularly preferably used in the present invention. To such a resin, additives such as a coloring agent, a modifier, an antioxidant and a weather-resisting agent, may be incorporated.

The reinforcing fiber to be used for the fiber-reinforced thermoplastic resin base material in the present invention may, for example, be a glass fiber, a carbon fiber, an aramid fiber, a ceramic fiber, etc. and is selected depending on the use of the molded product. For example, a carbon fiber is used in the compound for an electromagnetic wave shield and a glass fiber is used in the case where the cost performance is considered. These fibers may be used alone or in combination.

The reinforcing fiber usually has from 6 to 23 $\mu$m as the average diameter of the monofilaments and preferably from 10 to 17 $\mu$m. If the average diameter of the monofilaments is less than 6 $\mu$m, the cost of the base material will increase, and further, the surface area of the reinforcing fiber tends to be large to result in poor flowability at the step of the molding, when the content of the reinforcing fibers in the base material is the identical. On the other hand, if the average diameter of the monofilaments exceeds 23 $\mu$m, the resulting fiber-reinforced thermoplastic resin base material tend to be poor in the mechanical property.

The number of the filaments in the continuous reinforcing fiber contained in the single fiber-reinforced thermoplastic resin base material is preferably from 100 to 1600 filaments. If the number of the filaments is less than 100 filaments, a large number of strand of the reinforcing fibers will be required for preparing the base material having sufficient strength, whereby the operation tends to be cumbersome. On the other hand, if the number of the filaments exceeds 1600 filaments, the uniform impregnation of the thermoplastic resin among monofilaments tends to be difficult, and the resulting the base material tend to be thick, whereby the objective can not be attained. Further, the dispersion of the fibers in the molded product tends to be poor, whereby the expected mechanical strength of the finally resulting molded product is difficult to be attained.

When the fiber-reinforced thermoplastic resin base material is scattered, the base material is preferably in bulky state in the present invention, whereby the heating gas can pass easily through the base material. The degree of the bulkiness of the base material is preferable to satisfy the following formula: $1/100 \leq \rho_1/\rho_0 \leq 1/2$, more preferably, $1/50 \leq \rho_1/\rho_0 \leq 1/3$, when $\rho_1$ is the bulk density of the base material in the accumulated state, and $\rho_0$ is the true density of the base material. If $\rho_1/\rho_0$ exceeds ½, the bulky degree tends to be small, whereby the heating gas is difficult to pass and heat-melting time to be required will become much. If $\rho_0/\rho_0$ is less than $1/100$, the bulky degree tends to be large to result in the low density of the base material, whereby the molten amount tends to be poor even if much heating gas is supplied, and thus will be poor in the productivity, such being undesirable.

The bulk density $\rho_1$, of the base material which is scattered and accumulated can be measured in a container such as a messcylinder, a beaker, etc., which has an inner diameter larger than the length of the base material, wherein the base material is scattered at random as much as possible. The true density $\rho_0$ can be obtained from the theoretical density of the base material.

The fiber-reinforced thermoplastic resin base material used in the present invention may be in a form of a string or in a tape and preferably in form of a string. Here, the string form is meant for the base material having the cross sectional shape being a circular, oval shape or the like, and the ratio of a long diameter/a short diameter being at most 3. In the case of the ratio exceeds 3, wherein the shape is substantially flat like a tape shape, the material tends to be scattered in a two dimension, whereby gaps through which the heating gas may pass is not sufficiently built as compared to the string form of the base material. When the fiber-reinforced thermoplastic resin base material is in a string form, its average diameter is preferably from 0.1 to 1.5 mm, more preferably from 0.2 to 1.0 mm. If the diameter is less than 0.1 mm, the breakage of the filaments and fuzz are likely to arise during the preparation of the base material, whereby the productivity tends to be poor. If the diameter exceeds 1.5 mm, the obtained base material tends to be thick to result in poor dispersion of the reinforcing fibers, as well as the poor heat efficiency by the heating gas, whereby an expected mechanical strength of the finally resulting molded product is difficult to be attained, such being undesirable.

The length (cut length) of the fiber-reinforced thermoplastic resin base material is preferably from 10 to 50 mm, more preferably from 15 to 40 mm. If the cut length is less than 10 mm, the mechanical property of the finally obtained molded product tends to be poor, such being undesirable. If the cut strength exceeds 50 mm, the handling efficiency tends to be poor and the flowability of the base material during the press-molding is likely to be low, such being undesirable.

When the fiber-reinforced thermoplastic resin base material is a string form, L/D is preferably from 15 to 100 and more preferably from 30 to 80, where the average diameter is D and the average length is L. If L/D is less than 15, the accumulated product of the base material is difficult to be bulky, when the base material is scattered and accumulated in a vessel. In such a case, the paths for passing of the heating gas is unlikely to be suitably formed, whereby a uniform heating will be difficult to be obtained. If L/D exceeds 100, the degree of the bulkiness tends to be large and become low density of the base material, whereby the molten amount tends to be poor even if much heating gas is supplied and thus will be in poor productivity, such being undesirable. Further, L/d is within said range, the reinforcing fibers is likely to flow in the interwined state in the mold when the base material is supplied. Thus, the reinforcing fibers tend to be easily dispersed in the obtained product to improve the strength of the obtained molded product.

In the fiber-reinforced thermoplastic resin base material to be used in the present invention, the content of the reinforcing fibers is preferably from 15 to 80 vol %, more preferably from 20 to 70 vol %. If the content of the reinforcing fibers is less than 15 vol %, the reinforcing effect tends to be low and if it exceeds 80 vol %, the amount of the matrix (the thermoplastic resin) surrounding the fibers tends to be too small, whereby it will be difficult to secure an impregnation rate of at least 95%, as mentioned later.

The impregnation rate of the thermoplastic resin in the base material is preferably at least 95%. If the impregnation rate in the molded product such as a tiptoe core for a safety shoe is less than 95%, the molded product having uniform mechanical properties is difficult to be obtained, and in some cases, the reinforcing fibers tends to stand out from the surface of the molded product, such being undesirable.

Here, the impregnation rate is one determined by the following formula 1 from the void area and the total cross sectional area as observed, when the cross section of the fiber-reinforced thermoplastic resin base material was observed by an electron microscope with 200 magnifications, and in a 20 mesh. If voids (air bubbles) are observed in the mesh even little, this mesh is added as a void area.

[(Total cross sectional area−Void area)/Total cross sectional area]× 100 (%)　　　Formula 1

In a process for producing a fiber-reinforced thermoplastic resin base material, it is preferably carried out to supply strands of reinforcing fibers into a molten resin bath and impregnate a resin to the reinforcing fiber strands by a melt impregnation method, followed by pultruding a single or a plurality of the reinforcing fiber strands from a nozzle to obtain a long or continuous fiber-reinforced thermoplastic resin base material.

Further, when a process for pultruding a single of the bundled reinforcing fiber strands without applying splitting thereto from a nozzle is used, the pultrusion from the nozzle tends to be easy and the content of the reinforcing fibers can be increased, and further the growing of the fuzz can be decreased, such being desirable. When the above method is employed, the fiber-reinforced thermoplastic resin base material having a small diameter can be easily prepared. The base material prepared in the manner described above, can be readily softened or solidified by a small amount of heat. As a result, the heating time of the base material can be shortened, whereby it is possible to suppress the heat deterioration of the resin contained in the base material at the minimum level, when the base material is heated.

Moreover, a package of a fiber-reinforced thermoplastic resin base material is prepared by accumulating said base material with a shape of string or tape in a bulky state and packing the resulting accumulated product with a thermoplastic resin film.

The thermoplastic resin to be used for the material of said film is not limited and a various resin can be employed. A resin having mutual solubility with the thermoplastic resin contained in the base material is preferred and it is particularly preferred to use the same kind resin of the base material. For example, a polyolefin resin, a polyamide resin or a polyester resin is preferably used. Specifically, the polyolefin may, for example, be the polypropylene, polyethylene, and random copolymer or a block copolymer of propylene-ethylene from the points of tear resistance, anti-cracking and cold resistance. The polyamide resin may, for example, be nylon 6-6, nylon 6, nylon 12 or MXD nylon. Further, the polyester resin may, for example, be polyethylene terephthalate or polybutylene terephthalate. It is particularly preferred to use the resin mentioned above in the present invention. To such a resin, additives such as a coloring agent, a modifier, an antioxidant and a weather-resisting agent may be incorporated.

While the film to be used for the package is processed or not, it is preferred to use a film having a heat shrinking property to prevent from becoming voluminous, when it is used for the packing. Moreover, a stretched film is preferably used so that it will be quickly melt to form opening when applied by heating gas hereto.

The thickness of the film is preferably from 10 to 100 $\mu$m, more preferably from 10 to 50 $\mu$m, while it is not limited. If the thickness is less than 10 $\mu$m, the film will be easily broken. If the thickness exceeds 100 $\mu$m, the film tends to be difficult to be melted to causing the poor productivity when applied by heating gas, and the part on the film having a rich amount of the resin will be formed, which will be melted to be sticky to result in the poor work efficiency, such being undesirable.

While it is not necessarily limited, the package has preferably a similar shape and an equal size to the vessel, through which the heating gas pass. That is because the base material can be uniformly and bulkily accumulated, whereby the heating gas can pass uniformly through the gaps among the base material, when the heating gas is applied to the film of the package in order to melt the film. If the package has a bigger size and a much different shape compared with the vessel, it will be impossible to set the package into the vessel or a big space will be formed between the package and the vessel, whereby the heating gas will not efficiently used to melt the base material, since it will not practically pass the narrow gaps among the base material, but pass through said big space.

While the package in the present invention is sealed up or air permeable, it is preferably to cover its entire surface of the base material with a film during the transportation. To make the package air permeable, it is preferred to employ a method, wherein the mouth of the package is not sealed or partly opened, or plural small holes are punched in the film of the package to the extent that the base material can not be dropped out from the package. In either method, explosion of the package during the transportation is prevented by ventilation; the package will be flexible and easy to handling, and the heating gas is allowed to pass through easily to melt the package. Said film of the package may be usually a membrane like shape, but a net like shape, fabric or non woven fabric can be preferably employed, so long as the base material is not dropped from the package.

In the present invention, it is preferred to employ such a method by which the size of the package can be made small, for example, a method wherein the base material is packed while absorbing the inside air of the package, or a method wherein the film is made to shrink after packed. As a method for closing the mouth of the package, a heat sealing method and a method using a glue or an adhesive tape, etc. can be employed. Such closing method can be a entirely sealing or a partially closing where a part of the package is left opened. To make holes on the package for air permeation before or after sealing is also allowed.

At the step where the base material or the package containing the base material is supplied to the area through which heating gas is pass, it is provided with a vessel wherein the base material or the base material in the package can be kept in the bulky state when the base material is scattered and accumulated, or the package is supplied to it. Such vessel may preferably have a structure which can hinder the heat escaping, when the heating gas is blown into it. The base material is scattered and accumulated in such vessel stated above. While an ordinal scattering method can readily make a bulkily accumulated product of said base material, it is preferred to scatter uniformly the base material each time in a certain uniform amount so that the base material can be scattered in all three dimensional direction as possible.

As a shape of said vessel, it is particularly preferred to employ a tube-like. Such tube may have a cross section of a circle, quadrilateral or others. While a size of the tube is not limited, the diameter (the shorter side length in the case of quadrilateral) is preferably at least the length of the base material. The tube is required to have a structure to allow the pass of the heating gas and thus is equipped with an inlet and an outlet for the heating gas.

The arrangement of the tube is not limited, and such as vertical arrangement and horizontal arrangement can be employed. It is preferred to arrange the tube so that the inlet and the outlet for the heating gas are positioned respectively at the upper end and the lower end of the tube. For example, in the case where the lower end of the tube is provided with a mesh made of metal etc., the heating gas can be blown into the tube through it. On the contrary, it is possible that the heating gas is blown from the upper end of the tube and is discharged through the metal mesh etc. at the lower end of the tube. Instead of the mesh made of metal etc., a slit or the like can be installed at the lower end of the tube.

The step of forming a molten mass includes a process wherein a heating gas is passed through said scattered and accumulated base material to melt the resin contained in the base material. As a method for passing the heating gas, it can be raised such a method by which the hot wind of the heating gas is blown into the scattered and accumulated base material, or a method by which the heating gas is passed through the base material placed a heated atmosphere. Among them, the method using a hot wind is particularly preferred since it can quickly melt the base material.

In the method using a hot wind blowing, the wind velocity is not particularly limited since it depends on the vessel to be used, the shape and the size of the base material, etc. Above all, it is preferred to employ a high wind velocity within a range where the base material is not blown away, and thus from 0.3 to 10 m/s, particularly from 0.5 to 5 m/s is preferred.

By passing the heating gas, the resin contained in accumulated base material is melted and thus the bulk of the base material will be reduced by the self weight or by an outside pressure to form a molten mass made of a chunk of the base material. Since the molten mass obtained by the self weight is voluminous and has a large surface area, it is preferred to press it by a low pressure to form a pressed molten mass, which is easily handled on the dislocating to a mold and is not hardly cooled before a molding. A pressure under which the bulkily molten mass is pressed is preferably from 0.1 to 1.5 kg/cm$^2$. In this case, since a whole of the base material is heated to become flexible, the reinforcing fibers is not broken or destroyed even applied a pressure, whereby a molten mass having a considerable high density is obtained and thus a finally resulting molded product has a sufficient mechanical strength and a superior outer appearance.

When the molten mass is pressed in the vessel, the inlet and the outlet are preferably closed to shut off the heating gas in order to avoid an excess heating. A plunger is preferably employed for the pressing and a heated plunger is particularly preferred to prevent lowering the temperature of the molten mass. The pressing surface of the plunger is preferably designed to adapt the inside cross section of the tube.

The molten mass pressed by using a plunger can be densely thick material having substantially no gaps, or can be the material having a few gaps to the extent of the handling being capable.

The temperature T of the heating gas varies depending on the thermoplastic resin to be used in the fiber-reinforced thermoplastic resin base material. When $T_1$ is the melting temperature of the thermoplastic resin used, it is preferred to satisfy the following formula: $T_1 \leq T \leq T_1+100°$ C., particularly $T_1+10°$ C.$\leq T \leq T_1+80°$ C. If T is less than $T_1$, it is difficult to melt the resin, and if T exceeds $T_1+100°$ C., it is likely to cause a heat deterioration to lower a mechanical strength of the molded product, such being undesirable.

The heating gas can be obtained by a hot wind generator or the like. The heating gas to be used in the present invention is not particularly limited, and as an is example can be raised air, an inactive gas, a reductive gas etc. Above all, an air and/or an inactive gas is preferably employed. If the thermoplastic resin to be used is not deteriorated by the oxidation with aide of heat, and thus the mechanical strength of the molded product is not damaged, an air will be advantageously used from the low cost. If deteriorated on the contrary, an inactive gas or a reductive gas is preferably employed in a pure or mixed state. Here, an inactive gas includes a gas of a rare-gas element and a chemically inactive gas such as $N_2$, $CO_2$. A reducing gas may be added to the above gas to avoid the oxidation.

According to the present invention, wherein the fiber-reinforced thermoplastic resin base material in a string form or in a tape form is employed and is heated by a heating gas, a molten mass from the base material can be prepared, for the first time, in a short period time.

Further, in the present invention, since the molten mass is prepared without almost applied shear force, the average residue fiber length of the reinforcing fibers in the molten mass obtained can readily retain the original average length of the base material. The average residue fiber length of the reinforcing fiber in the molten mass can be preferably at least 95%, more preferably at least 97%. This will control the breakage of monofilaments of the reinforcing fibers so that the lowering of the fluidity caused by the bulk expansion at applied shear force and the deterioration of the resin caused by the caught air are prevented, whereby the mechanical strength of the molded product will not be reduced.

In the step wherein said molten mass is supplied into a mold and is press-molded, the molten mass prepared in a previous way is taken out and is dislocated into a mold, by, for example, a labor, a conveyor or a robot.

The supplying means may be selected by taking into consideration of the flowability, the outer appearance and the solidifying time of the thermoplastic resin used, and is preferably supplied directly into a forming mold to maintain the flowability for the molding.

While a condition of press-molding of the molten mass in the forming is optionally selected considering the fluidity, the outer appearance and the solidifying time of the thermoplastic resin to be used, an ordinal condition for a press-molding is generally employed. For example, the mold may be preferably heated by a heater, etc. and the molding temperature may follow the temperature of a usual molding of the thermoplastic resin, which is less than the meting point of the thermoplastic resin. The pressure of the press-molding is preferably from 80 to 300 kg/cm$^2$.

The process for producing a fiber-reinforced thermoplastic molded product of the present invention can be applied to a manufacture of various molded products such as an automobile parts, electrical appliance products, industrial materials, civil engineering materials and commodity products. Especially, it is preferably applied to the manufacture of a tiptoe core for a safety shoe, which has at most 35 g as a weight of one piece and at most 4 mm as a thickness of its maximum part can satisfy the performance of S kind standard as safety shoes stipulated in JIS T8101.

Figure 2:
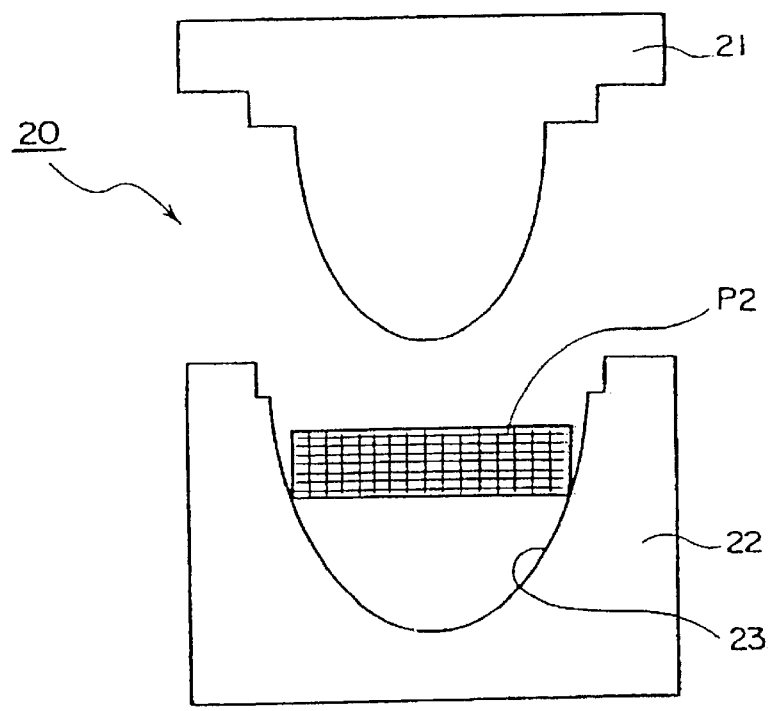
FIG. 2 is a view illustrating an example of the step of molding in the process of the present invention.
Figure 2:
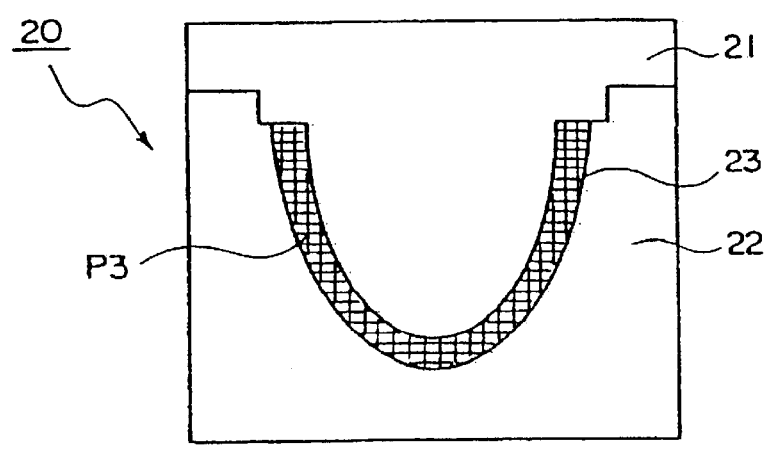
Figure 4:
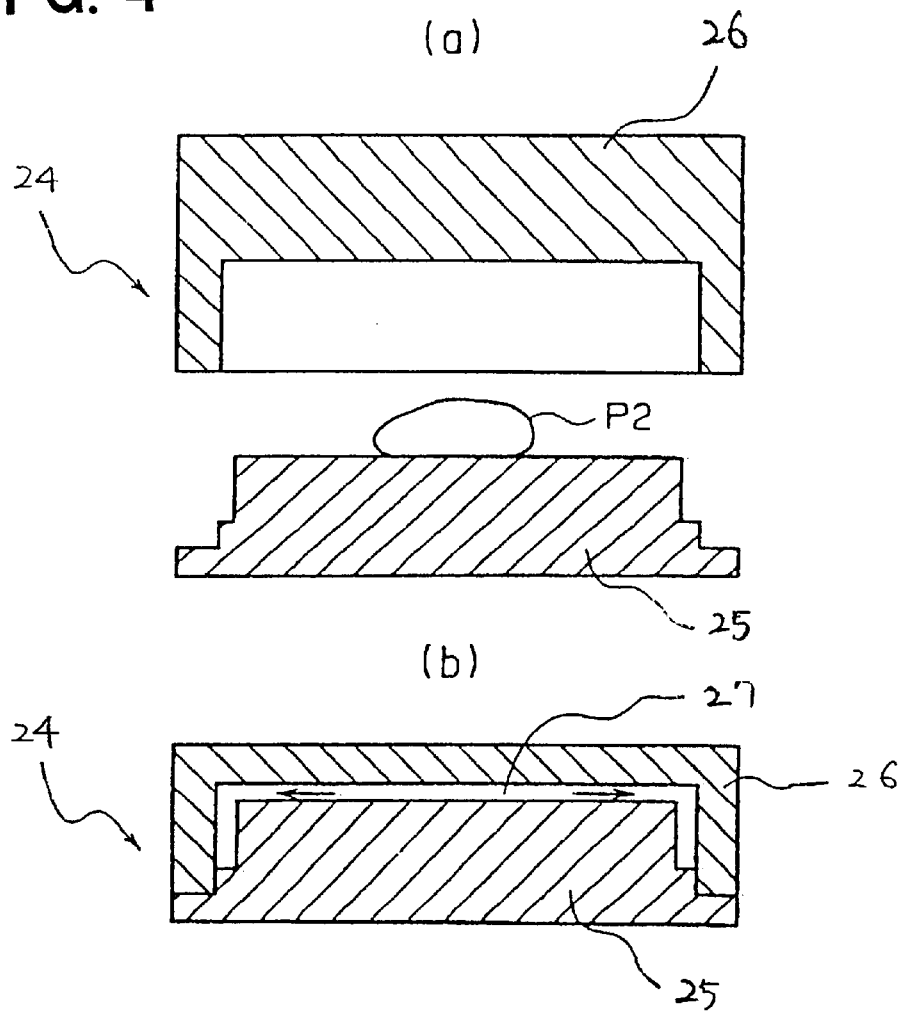
FIG. 4 is a view illustrating another example of the step of molding in the process of the present invention.
Figure 5:
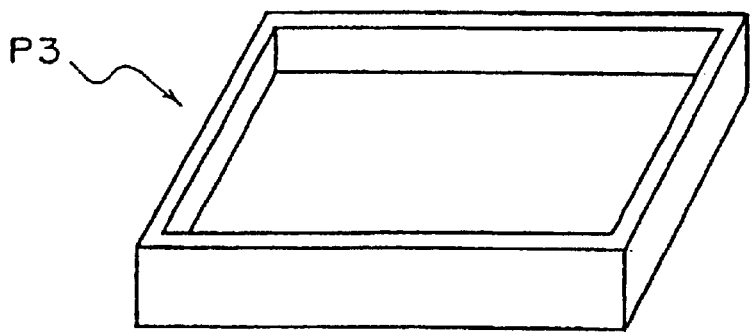
FIG. 5 is a perspective view showing another example of the product obtained by the present invention.
Figure 6:
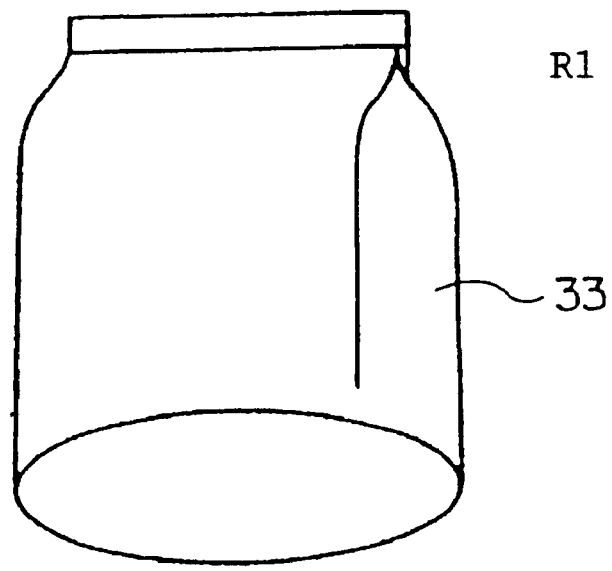
FIG. 6 is a perspective view showing another example of the package used in the present invention.
Figure 7:
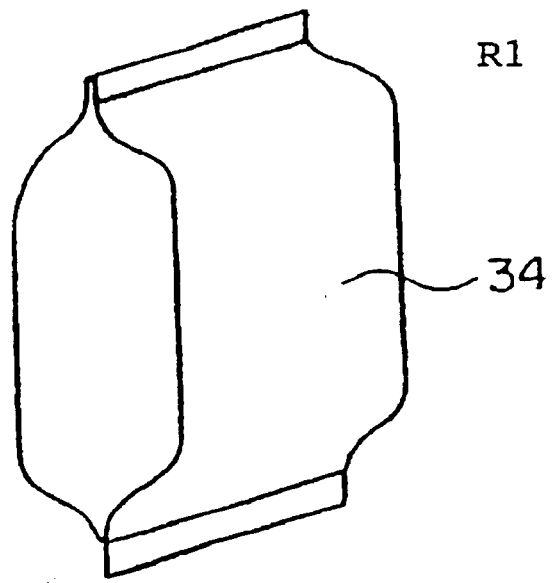
FIG. 7 is a perspective view showing further another example of the package used in the present invention.

FIGS. 1, 2 and 4 are views illustrating an example of a process for producing a fiber-reinforced thermoplastic molded product of the present invention. FIGS. 3 and 5 perspective views showing examples of the molded products produced by the present invention. FIGS. 6 and 7 are views illustrating the shapes of the packages to be used in the present invention.

In a process for producing a fiber-reinforced thermoplastic molded product of the present invention, as shown in FIG. 1(a), the vessel or tube 11 has a flow path 12 went up and down through the tube, and at the lower position of the flow path 12 is provided with a metal mesh 13. At the further lower position of the metal mesh 13 is arranged a dumper 14 which controls a supply of a hot wind. Further, at the upper position of the tube 11, is arranged a plunger 15, which is movably arranged in the tube 11. The lower part of the tube 11 forms an inlet 16 for the wind H, and the upper part of the tube 11 forms an outlet 17. The upper part of the tube 11 is designed to be separable upwardly from the metal mesh 13, as mentioned below.

In the FIG. 1, the fiber-reinforced thermoplastic resin base material P1 in a string form or in a tape form is scattered and accumulated on the metal mesh 13 in the tube 11. In the case of using a package, the package R1 of the present invention, prepared by packing the fiber-reinforced thermoplastic resin base material in a string form or in a tape form with a thermoplastic film, is inserted into the inside of the tube 11 and arranged on the metal mesh 13. At this situation, as the same manner as in FIG. 1, by opening the dumper 14, a hot wind H is supplied from the inlet 16 to flow upwardly in the flow path 12 and discharged from the outlet 17. As a result, the hot wind H can pass through the gaps among the bulkily accumulated base material P1, whereby the accumulated base material P1 in a string form or in a tape form is quickly heat-melted.

In the case of the package, the film is melted to make holes, from which the hot wind H pass through the gaps among the bulkily accumulated base material to heat-melt R1 in the same manner as in the P1.

The temperature T of the hot wind H, as mentioned before, is preferred to satisfy the following formula: $T_1 \leq T \leq T_1+100°$ C., particularly $T_1+10°$ C.$\leq T \leq T_1+80°$ C., wherein $T_1$ is the melting temperature of the thermoplastic resin used.

As shown in FIG. 1(b), the fiber-reinforced thermoplastic resin base material P1 is heat-melted to be soften to form the molten mass P2 since its self weight decreases the volume.

Then, as shown in FIG. 1(c), the dumper 14 was closed and the plunger 15 was inserted into the inside of the tube 11 to further press said molten mass P2, whereby the resulting molten mass P2 was made to have a higher density. The above pressure, as stated before, is preferred to be relatively low of from 0.1 to 1.5 kg/cm², whereby the length of the residue filaments of the reinforcing fibers in the molten mass P2 can be retained at least 95% of the average length of the original filaments in the reinforcing base material P1.

After the molten mass P2 of the fiber-reinforced thermoplastic resin base material was prepared in the above manner, the upper end of the tube 11 was separated upwardly with the plunger 15, as shown FIG. 1(d), and then the molten mass P2 was taken out to dislocate it into the mold 20, shown in FIG. 2. This dislocation can be carried out by means of labors, a conveyer, a robot and so forth.

As shown FIGS. 2 and 4 respectively, the molds 20, 24 are composed of the male molds 21,25 and the female molds 22,26, between which the cavity space 23,27 is formed. The molds 20, 24 is kept at a suitable temperature, preferably from 80 to 100° C. by using a heater not shown in the FIGS.

Respectively, as shown in FIGS. 2(e) and 4(a), the molten mass P2 taken out from the tube 11 is inserted into the cavity space 23,27 of the molds 22,26 within a time, for example several ten seconds, so that the molten thermoplastic resin is not solidified.

At this stage, as shown in FIGS. 2(f), 4(b), respectively, the male molds 21,25 is entered into the female molds 22,26 to press the molten mass P2 between them, and the thermoplastic resin of the molten mass is solidified at this step to obtain the molded product P3. Then, the molded product P3 is taken out after the male molds 21,25 and the female molds 22,26 have been opened, As an example of the molded product P3 produced in the above described manner, a tiptoe core for a safety shoe shown in FIG. 3 and the molded product shown in FIG. 5 can be raised. The length of the residue filaments of the reinforcing fibers in the molded product P3 can retain at least 90% of the average length of the original filaments in the reinforcing base material P1, whereby the strength of the molded product P3 can be improved.

EXAMPLE 1

A single glass fiber strand obtained by bundling 600 mono filaments having a average diameter of 13 μm was introduced into an acid modified molten polypropylene (260° C.) with M1 (melt index) of 40, and subjected to melt impregnation, and then pultruded from a nozzle having a inner diameter of 0.53 mm at rate of 50 m/min, and cut into a length of 20 mm by a pelletizer to obtain a fiber-reinforced thermoplastic resin base material. This base material has a average diameter of 0.53 mm, L/D of 37.7, a glass content of 45.5 vol % and a rate of resin impregnation of 100% (average number of n=5, n is the number of the measuring).

The above glass content was obtained by heating the obtained fiber-reinforced thermoplastic resin base material in an electric furnace of 600° C. to burn off the resin, then calculating the glass content (wt %) from the weight of the remaining glass and converting this value to vol % on the base such that the specific gravity of the resin is 0.91 and the specific gravity of the glass fibers is 2.54.

30 g of the above obtained fiber-reinforced thermoplastic resin base material was scattered into a tube 11 having a inner diameter of 60 mm shown in FIG. 1 and melted by blowing hot wind H from a lower end of the tube through a metal mesh 13. The velocity of the hot wind was 1.7 m/s, the temperature of the hot wind above the metal mesh 13 was 200° C., and the melting time was 30 seconds.

After the blowing of the hot wind was stopped, a plunger 15 heated at 200° C. was inserted from the upper end of the tube 11 and applied by a pressure of 1 kg/cm² to obtain a molten mass P2. The length of the residue filament of glass fiber in the molten mass P2 was obtained by burning the molten mass P2 at 600° C. and measuring 100 numbers of the optionally selected remaining monofilaments to obtain the average. It was 20 mm, which was 100% of the original length of the filaments in the base material.

The resulting molten mass P2 was supplied by labors to a shaping metal mold 20 shown in FIG. 2, and was press-molded to obtain a tiptoe core for a safety shoe as a molded product P3. The length of the residue filament in the molded product obtained was 19.4 mm, which was 97% of the original length of the filament in the base material.

EXAMPLE 2

A tiptoe core for a safety shoe as a molded product was produced in the same manner as in Example 1 except that L/D of the fiber-reinforced thermoplastic resin base material was 56.6 (cut length: 30 mm). The length of the residue filaments in the molten mass retained 100 of the original length of the filament in the base material. The length of the residue filaments in the tiptoe core for a safety shoe retained 95% of the original length of the filament in the base material.

EXAMPLE 3

A tiptoe core for a safety shoe was produced in the same manner as in Example 1 except that a fiber-reinforced thermoplastic resin base material having an average diameter of 0.70 mm, a glass content of 32.2 vol % and L/D of 28.6 (cut length: 20 mm) was employed. The length of the residue filaments in the molten mass retained 100% of the original length of the filament in the base material. The length of the residue filaments in the tiptoe core for a safety shoe retained 97% of the original length of the filament in the base material.

EXAMPLE 4

A similar fiber-reinforced thermoplastic resin base material as used in Example 1 was prepared except that L/D of 18.9 (cut length: 10 mm) of the base material. 30 g of the above obtained base material was scattered into a tube 11 having a inner diameter of 60 mm shown in FIG. 1 and melted by blowing hot wind H from a lower end of the tube through a metal mesh 13.

The velocity of the hot wind was 1.7 m/s, the temperature of the hot wind above the metal mesh 13 was 200° C. and the melting time was 40 seconds, which is a little longer since the passing gaps of the hot wind became small. Then a tiptoe core for a safety shoe was produced in the same manner as in Example 1. The length of the residue filaments in the molten mass retained 100% of the original length of the filament in the base material. The length of the residue filaments in the tiptoe core for a safety shoe retained 95% of the original length of the filament in the base material.

EXAMPLE 5

Sixteen glass fiber strands (the average diameter of the mono filaments: 13 μm, the number of mono filaments per strand: 600) were bundled, introduced into an acid modified molten polypropylene (260° C.) with M1 (melt index) of 40, and subjected to melt impregnation, and then pultruded from a nozzle having a inner diameter of 2.2 mm at rate of 20 m/min, and cut into a length of 20 mm by a pelletizer to obtain a fiber-reinforced thermoplastic resin base material. This base material has the average diameter of 2.2 mm, L/D of 9.1, the glass content of 45.5 vol % and the rate of resin impregnation of 98% (average number of n=5).

30 g of the above obtained fiber-reinforced thermoplastic resin base material was inserted into a tube 11 having a inner diameter of 60 mm shown in FIG. 1 and melted by blowing hot wind H from the lower end of the tube through the metal mesh 13.

The velocity of the hot wind was 1.7 m/s, and the temperature of the hot wind above the metal mesh 13 was 200° C. and the melting time was 90 seconds, which is a little longer since L/D. The bulk of the base material was low to make the passing gaps of the hot wind small and a diameter of the tube was large. Then a tiptoe core for a safety shoe was produced in the same manner as in Example 1. The length of the residue filaments in the molten mass retained 100% of the original length of the filament in the base material. The length of the residue filaments in the tiptoe core for a safety shoe retained 89% of the original length of the filament in the base material.

EXAMPLE 6

Five glass fiber strands (an average diameter of the mono filaments: 13 μm, the number of mono filaments per strand: 600) were bundled, introduced into an acid modified molten polypropylene (260° C.) with M1 (melt index) of 40, and subjected to melt impregnation, and then pultruded from a slit nozzle having a thickness of 0.12 mm and a width of 10.0 mm at rate of 30 m/min, and cut into a length of 20 mm by a pelletizer to obtain a tape shape of the fiber-reinforced thermoplastic resin base material. The obtained base material has a thickness of 0.12 mm, a width of 10 mm, an average length of 20 mm, a glass content of 43 vol % and a resin impregnation rate of 98% (average number of n=5). 30 g of the above obtained fiber-reinforced thermoplastic resin base material was inserted into a tube 11 having a inner diameter of 60 mm shown in FIG. 1 and melted by blowing hot wind H from a lower end of the tube through a metal mesh 13. The velocity of the hot wind was 0.9, which was smaller than 1.7 m/s in Example 1, since the tape form of the base material had a large flow resistance. The temperature of the hot wind above the metal mesh 13 was 200° C. and the melting time was 90 seconds.

After the blowing of the hot wind was stopped, a plunger 15 heated at 200° C. was inserted from the upper end of the tube 11 and applied by a pressure of 1 kg/cm² to obtain a molten mass. The length of the residue filaments in the molten mass was 20.0 mm, which retained 100% of the original length of the filament in the base material. By using this molten mass, a molded product of a tiptoe core for a safety shoe was produced in the same manner as in Example 1. The length of the residue filaments in the tiptoe core of the molded product was 19.4 mm, which retained 97% of the original length of the filament in the base material.

EXAMPLE 7

383 g of the fiber-reinforced thermoplastic resin base material employed in Example 1 was packed into a bag of polypropylene film having a inner diameter of 150 mm and a thickness of 20 μm to obtain a package. After the scattering among weight of the five packages was measured, one of the package R1 was arranged in a tube 11 having a inner diameter of 150 mm shown in FIG. 1. A hot wind H was blown into the tube from the lower end through a metal mesh 13. A velocity of the hot wind H was 1.7 m/s, and a temperature of the hot wind above the metal mesh 13 was 200 and a melting time was 60 seconds. Since the base material was already packed in the package, a procedure of arranging the package in the tube was simple. After the blowing of the hot wind was stopped, a plunger 15 heated at 200° C. was inserted from the upper end of the tube 11 and applied by a pressure of 1 kg/cm² to obtain a molten mass P2. The length of the residue filaments of glass fiber in the molten mass P2 was obtained by burning the molten mass P2 at 600° C. and measuring 100 numbers of the optionally selected remaining monofilaments to calculate the average. It was 20 mm, which was 100% of the original length of the filament in the base material.

The obtained molten mass P2 was dislocated by hands into a press-mold 24 having a box type cavity having a length of 200 mm×a width of 200 mm×a height of 50 mm×a thickness of 3 mm between a upper mold 25 and a lower old 26 shown in FIG. 4. The molten mass was pressed under a pressure of 150 kg/cm² for one minute by a hydraulic press machine to obtain a box shaped molded product P3. A test piece was cut out from a part (a charge part) of the product, which attached the earth first in the above molding, in accordance with ASTM D256 and D 790 and its mechanical strength was measured at each n=3. The length of the residue filaments in the resulting molded product P3 was 19.4 mm, which retained 97% of the original length of the filament in the fiber.

EXAMPLE 8

By using the same thermoplastic resin-combined fiber employed in Example 2, a box shaped molded product P3 was obtained in the same manner as in Example 7. The length of the residue filaments of glass fiber in the molten mass retained 100% of the original length of the filament in the fiber. The length of the residue filaments in the resulting molded product P3 retained 95% of the original length of the filament in the base material. Since the base material was already packed in the package, the procedure of setting the package in the tube was simple. In the same manner in Example 7, the test piece was cut out in according with ASTM D256 and D790 and was measured its strength at each n=3.

EXAMPLE 9

332 g of the same fiber-reinforced thermoplastic resin base material as employed in Example 3 was packed into a bag of polypropylene film having a inner diameter of 150 mm and a thickness of 20 μm to obtain a package. A box shaped molded product P3 was obtained in the same manner as in Example 7, except that said base material and said package were used. The length of the residue filaments of glass fiber in the molten mass retained 100% of the original length of the filament in the base material. The length of the residue filaments in the resulting molded product P3 retained 97% of the original length of the filament in the base material. Since base material was already packed in the package, the procedure of setting the package in the tube was simple. In the same manner as in Example 7, the test piece was cut out in according with ASTM D256 and D790 and was measured its strength at each n=3.

EXAMPLE 10

383 g of the same fiber-reinforced thermoplastic resin base material as employed in Example 4 was packed into a bag of polypropylene film having a inner diameter of 150 mm and a thickness of 20 μm. The scattering of weights among five packages obtained by the above packing was measured. Then, one of the packages R1 was arranged in a tube having a inner diameter of 150 mm shown in FIG. 1 and a hot wind H was blown into the tube through a metal mesh 13 from the lower end of the tube to melt the package. Since the base material was already packed in the package, the procedure of arranging the package in the tube was simple.

The velocity of the hot wind was 1.7 m/s, the temperature of the hot wind above the metal mesh 13 was 200° C. and the melting time was 90 seconds, which was a little bit longer since the passing gaps of hot wind became small. Then, a box shaped molded product P3 was obtained in the same manner as in Example 7. The length of the residue filaments of glass fiber in the molten mass retained 100% of the original length of the filament in the base material. The length of the residue filaments in the resulting molded product P3 retained 95% of the original length of the filament in the base material. In the same manner as in Example 7, the test piece was cut out in according with ASTM D256 and D790 and was measured its strength at each n=3.

Control Example 1

The same fiber-reinforced thermoplastic resin base material as employed in Example 1 was prepared and by using a flat press of heating and cooling type, was pressed to obtain a sheet having a thickness of S mm.

Two sheets of blanks having a size of 4 cm×4.6 cm were cut out from the above sheet. The blanks were re-melted in a heating furnace at 250° C. by far infrared rays. The remelting required 280 seconds, which was a little longer than expected.

Two sheets of the resulting blank put together to form a layer were supplied to a metal mold for a tiptoe core for a safety shoe and was molded to obtain a molded product of a tiptoe core for a safety shoe. The length of the residue filaments of glass fiber in the molten blanks retained 98% of the original length of the filament in the base material, since the sheet was melted in the form of the blank. The length of the residue filaments in the molded tiptoe core retained 94% of the original length of the filament in the base material.

Control Example 2

From a continuous fiber-reinforced typed stampable sheet (Trade name "Azdel GC 40%" manufactured by Ube Nitto Co. Ltd.) having a thickness of 3.8 mm, which is available on the market, two sheets of blank having a size of 4 cm×6.1 cm were cut out. Then, these sheets were arranged to remelt them in a heating furnace at 250° C. by far infrared rays. At this step, the insulating layers were formed in the blanks due to their expansion based on the glass fibers' repulsion contained. As a result, the melting required 280 seconds despite of a rather thin thickness of 3.8 mm.

Two sheets of the resulting blank put together to form a layer were supplied to a metal mold for a tiptoe core for a safety shoe and were molded to obtain a molded product of a tiptoe core for a safety shoe.

Control Example 3

From a continuous fiber-reinforced typed stampable sheet (Trade name "Azdel GC 40%" manufactured by Ube Nitto Co. Ltd.) having a thickness of 3.8 mm, which is available on the market, two sheets of blank having a size of 4 cm×9.2 cm (Total weight: 45 g) were cut out. Then these blanks were arranged in a heating furnace at 250° C. by far infrared rays to remelt them. At this step, the insulating the insulating layers were formed in the blanks due to their expansion based on the glass fibers' repulsion contained. As a result, the melting required 280 seconds despite of a rather thin thickness of 3.8 mm.

Two sheets of the resulting blank put together to form a layer were supplied to a metal mold for a tiptoe core for a safety shoe and were molded to obtain a molded product of a tiptoe core for a safety shoe.

Control Example 4

The same fiber-reinforced thermoplastic resin base material as employed in Example 1 was prepared and by using a flat press of type of heating and cooling, was pressed to obtain a sheet having a thickness of 5 mm. Five sheets of a blank having a size of 15.3 cm$^2$ were cut out from the above sheet and the scattering in the weights were found to be large. The two sheets of them were remelted in a heating furnace at 250° C. by far infrared rays. The remelting required 280 seconds, which was a little longer than expected.

Two sheets of the resulting the blank put together to form a layer were supplied to a box shaped metal mold shown in FIG. 4 and then was molded to obtain a box shaped molded product. The length of the residue filaments of the fiber in the molten blanks retained 98% of the original length of the filament in the base material, since the sheet was melted in the form of the blank. The length of the residue filaments of the fiber in the molded product retained 94% of the original length of the filament in the base material. In the same manner in Example 7, the test piece was cut out in according with ASTM D256 and D790 and was measured its strength at each n=3.

Control Example 5

From a continuous fiber-reinforced typed stampable sheet (Trade name "Azdel GC 40%" manufactured by Ube Nitto CO. Ltd.) having a thickness of 3.8 mm, which is available on the market, five sheets of blank having a size of 14.3 cm$^2$ (weight: 93.3 g) were cut out. The scattering in the weights were found to be large. The three sheets of them were remelted in a heating furnace at 250° C. by far infrared rays. At this step, the insulating the insulating layers were formed in the blanks due to their expansion based on the glass fibers' repulsion contained. As a result, the melting required 280 seconds despite of a rather thin thickness of 3.8 mm.

Three sheets of the resulting blank put together to form a layer were supplied to a box shaped metal mold and then were molded to obtain a box shaped molded product. In the same manner as in Example 7, the test piece was cut out in according with ASTM D256 and D790 and was measured its strength at each n=3.

The evaluated results of the molded products obtained EXAMPLES 1–6 and CONTROL EXAMPLES 1–3 are shown in TABLE 1. The evaluated results of the molded products obtained in EXAMPLES 7–10 and CONTROL EXAMPLES 4 and 5 are shown in TABLE 2.

TABLE 1

|  | Unit | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Fiber base material | | | | | | | | | | |
| Reinforcing fiber | | Glass | Glass | Glass | Glass | Glass | Glass | Glass | Glass | Glass |
| Resin | | PP | PP | PP | PP | PP | PP | PP | PP | PP |
| Amount of fiber | vol % | 45.5 | 45.5 | 32.2 | 45.5 | 45.5 | 43 | 45.5 | 19.3 | 19.3 |
| Impregnation rate | % | 100 | 100 | 100 | 100 | 98 | 98 | 100 | 94 | 94 |
| Average diameter | mm | 0.53 | 0.53 | 0.70 | 0.53 | 2.20 | | 0.53 | | |
| Cut length | mm | 20 | 30 | 20 | 10 | 20 | 20 | 20 | | |
| Bulk density/True density | | 1/7.3 | 1/13.6 | 1/5.9 | 1/4.2 | 1/4.0 | 1/3.6 | ≈1/1 | ≈1/1 | ≈1/1 |
| L/D | | 37.7 | 56.6 | 28.6 | 18.9 | 9.1 | | 37.7 | ∞ | |
| Time required for heat melting | sec | 30 | 30 | 30 | 40 | 90 | 90 | 280 | 280 | 280 |
| Tiptoe core | | | | | | | | | | |
| Weight | g | 30 | 30 | 30 | 30 | 30 | 30 | 30 | 30 | 45 |
| Press destruction weight | kgf | 1820 | 1840 | 1310 | 1050 | 1020 | 1600 | 1500 | 890 | 1000 |
| Weight falling test | mm | 23.3 | 24.2 | 22.4 | 17.0 | 16.0 | 22.6 | 22.4 | 16.0 | 19.0 |
| Acceptance of standards kind | | ○ | ○ | ○ | ○ | ○ | ○ | ○ | × | × |

PP: Polypropylene
L: Average length of the base material
D: Average diameter of the base material
Press destruction weight and weight falling impact test were evaluated by the unit of the tiptoe in accordance with JIS T8101.
Weight falling impact test represents the height of plasticine after tested.

TABLE 2

|  | Unit | Ex. 8 | Ex. 9 | Ex. 10 | Ex. 11 | Comp. Ex. 4 | Comp. Ex. 5 |
|---|---|---|---|---|---|---|---|
| Fiber base material | | | | | | | |
| Reinforcing fiber | | Glass | Glass | Glass | Glass | Glass | Glass |
| Resin | | PP | PP | PP | PP | PP | PP |
| Amount of fiber | vol % | 45.5 | 45.5 | 32.2 | 45.5 | 45.5 | 19.3 |
| Impregnation rate | % | 100 | 100 | 100 | 100 | 100 | 94 |
| Average diameter | mm | 0.53 | 0.53 | 0.70 | 0.53 | 0.53 | |
| Cut length | mm | 20 | 30 | 20 | 10 | 20 | |
| Bulk density/True density | | 1/7.3 | 1/13.6 | 1/5.9 | 1/4.2 | ≈1/1 | ≈1/1 |
| L/D | | 37.7 | 56.6 | 28.6 | 18.9 | 37.7 | ∞ |
| At manufacturing | | | | | | | |
| Loss of trimming and blanking | | None | None | None | None | Yes | Yes |
| Scattering in weight of package and sheet (g) | | +1 / −0 | +1 / −0 | +1 / −0 | +1 / −0 | +38 / −0 | +28 / −0 |
| Time required for heat melting | sec | 60 | 60 | 60 | 90 | 280 | 280 |
| Retention of residue fiber in molten mass (%) | | 100 | 100 | 100 | 100 | 98 | — |
| Product | | | | | | | |
| Flexural strength | kg/mm$^2$ | 28 | 29 | 26 | 22 | 26 | 10 |
| Flexural modulus | kg/mm$^2$ | 1150 | 1130 | 1000 | 1170 | 1150 | 580 |
| Shalpy impact strength | kJ/m$^2$ | 120 | 130 | 110 | 70 | 110 | 60 |
| Retention of residue fiber in molded product (%) | | 97 | 95 | 97 | 95 | 94 | — |

PP: Polypropylene
L: Average length of the base material
D: Average diameter of the base material
Bending strength, bending elasticity and shalpy impact strength were respectively evaluated by ASTM D790 and ASTM D256.

It is evident from the results in TABLE 1 that EXAMPLES 1–6 have smaller heat-melting time, i.e. better workability compared with CONTROL EXAMPLES 1–5. Further, when the same fiber-reinforced thermoplastic resin base material in string form was used, it is evident that EXAMPLES have further shorter melting time and the strength of the molded products are excellent.

In EXAMPLES 7–10, the forming materials (packages) did not have any trimming losses, blanking losses, and substantial weight dispersion among the packages. Their heat-melting times were small, and the flexural strength, the flexural modulus and the impact strength were excellent.

In comparison with them, the forming material (sheet) in CONTROL EXAMPLE 4 had trimming losses, blanking losses, big weight dispersions among the packages, and required long heat-melting time. The forming material (sheet) in CONTROL EXAMPLE 5 had trimming losses, blanking losses, big weight dispersions among the packages, and required long heat-melting time. The strength of the molded products also were not sufficient.

INDUSTRIAL APPLICABILITY OF THE PRESENT INVENTION

As mentioned above, according to the present invention, the fiber-reinforced thermoplastic resin base material in a string form or in a tape form is scattered and accumulated and heating gas is passed to gaps among the bulkily accumulated base materials, whereby the fiber-reinforced thermoplastic resin base materials can be quickly and uniformly heat-melted to obtain the molten mass. Thus obtained molten mass can be press-molded to produce a formed product with superior mechanical strength resulted from long fibers contained and the excellent outer appearance. Especially, the tiptoe core for a safety shoe which has at most 35 g as the weight of one piece and at most 4 mm as the thickness of its maximum part can satisfy the performance of S kind standard as safety shoes stipulated in JIS T 8101.

According to the present invention using the package, a predetermined amount of the fiber-reinforced thermoplastic resin base material is packed with a thermoplastic resin film, whereby it is excellent in handling and transportation of said base material and it is possible to produce a molded product efficiently, since the blanking step and the measuring step on site are omitted. Moreover, after the base material have been produced, the heat-melting of the resin can be one time, whereby the cost of energy consumption will be reduced and the work efficiency will be improved as well as the heat deterioration of the resin will be lowered.

What is claimed is:

1. A process for producing a fiber-reinforced thermoplastic resin molded product, which comprises a step of supplying a base material wherein a fiber-reinforced thermoplastic resin base material in a string form or in a tape form is scattered and accumulated, a step of forming a molten mass wherein a heating gas is passed through said base material accumulated to heat-melt it thereby to form a molten mass, and a molding step wherein said molten mass is supplied to a mold and then is press-molded to form a molded product.

2. The process for producing a fiber-reinforced thermoplastic resin molded product according to claim 1, wherein said base material satisfies the following formula: $\frac{1}{100}\rho_1/\rho_0^{1/2}$, wherein $\rho_1$ is the density of said base material which is scattered and accumulated and $\rho_0$ is the true density of said fiber-reinforced thermoplastic resin base material.

3. The process for producing a fiber-reinforced thermoplastic resin molded product according to claim 1, wherein said base material has the following characteristics of from a) to d):

a) a string form with an average diameter of from 0.1 to 1.5 mm, b) a reinforcing fiber content of from 15 to 80 vol %, c) a average length L of from 10 to 50 mm, d) L/D of from 15 to 100, where D is an average diameter.

4. The process for producing a fiber-reinforced thermoplastic resin molded product according to claim 1, wherein said base material is heat-melted by passing a heating gas through it and then by pressing the molten material to obtain a molten mass of the base material.

5. The process for producing a fiber-reinforced thermoplastic resin molded product according to claim 1, wherein said molten mass is prepared in such a manner that the average fiber length of the reinforcing fibers in said molten mass retains at least 95% of the original fiber length of said base material.

6. The process for producing a fiber-reinforced thermoplastic resin molded product according to claim 1, wherein said step of forming a molten mass and said step of molding are carried out in such a manner that the average fiber length of the reinforcing fibers in said molded product retains at least 90% of the original fiber length of said base material.

7. The process for producing a fiber-reinforced thermoplastic/resin molded product according to claim 1, wherein air and/or an inactive gas is used as said heating gas.

8. The process for producing a fiber-reinforced thermoplastic resin molded product according to any one of claims 1–7, wherein a temperature T of said heating gas satisfies $T_1 \leq T \leq T_1 + 100°$ C., where $T_1$ is the melting temperature of the thermoplastic resin used.

9. A package of a fiber-reinforced thermoplastic resin base material for a forming material comprising an accumulated fiber-reinforced thermoplastic resin base material in a string form or in a tape form, wherein said base material is enclosed with a film of a thermoplastic resin.

10. The package of a fiber-reinforced thermoplastic resin base material for a forming material according to claim 9, wherein said base material satisfies the following formula: $\frac{1}{100}\rho_1/\rho_0^{1/2}$, wherein $\rho_1$ is the density of said base material which is scattered and accumulated and $\rho_0$ is the true density of said base material.

11. The package of a fiber-reinforced thermoplastic resin base material for a forming material according to claim 9, wherein said base material has the following characteristics of from a) to d).

a) a string form with an average diameter of from 0.1 to 1.5 mm, b) a reinforcing fiber content of from 15 to 80 vol %, c) a average length L of from 10 to 50 mm, d) L/D of from 15 to 100, where D is an average diameter.

12. The package of a fiber-reinforced thermoplastic resin base material for a forming material according to claim 1, wherein a thickness of said film of the thermoplastic resin is from 10 to 100 μm.

13. The package of a fiber-reinforced thermoplastic resin base material for a forming material according to claim 9, wherein said film of a thermoplastic resin/is a stretched film.

14. A process for producing a fiber-reinforced thermoplastic resin molded product, which comprises applying a heating gas to a package of a fiber-reinforced thermoplastic resin base material for a forming material whereby an opening is formed in said package by melting the package, passing the heating gas through the opening to prepare a molten mass of said base material and supplying the resulting molten mass to a mold to press-mold, wherein the package comprises an accumulated fiber-reinforced thermoplastic resin base material in a string form or in a tape form, said base material is enclosed with a film of a thermoplastic resin.

15. A fiber-reinforced thermoplastic resin molded product produced by any one of the process according to claim 1.

16. The fiber-reinforced thermoplastic resin molded product according to claim 15, wherein said resin molded product is a tiptoe core for a safety shoe satisfying the performance of S kind standard as safety shoes stipulated in JIS T 8101.

17. The fiber-reinforced thermoplastic resin molded product according to claim 16, wherein a weight of said tiptoe core for a safety shoe is at most 35 g.

18. The fiber-reinforced thermoplastic resin molded product according to claim 16, wherein a thickness of its maximum part of said tiptoe core for a safety shoe is at most 4 mm.

* * * * *